US009038088B2

(12) United States Patent
Phull et al.

(10) Patent No.: US 9,038,088 B2
(45) Date of Patent: May 19, 2015

(54) LOAD BALANCING ON HETROGENOUS PROCESSING CLUSTER BASED ON EXCEEDED LOAD IMBALANCE FACTOR THRESHOLD DETERMINED BY TOTAL COMPLETION TIME OF MULTIPLE PROCESSING PHASES

(75) Inventors: Rajat Phull, Monmouth Junction, NJ (US); Srihari Cadambi, Princeton Junction, NJ (US); Nishkam Ravi, Lawrenceville, NJ (US); Srimat Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 544 days.

(21) Appl. No.: 13/409,872

(22) Filed: Mar. 1, 2012

(65) Prior Publication Data
US 2012/0233486 A1 Sep. 13, 2012

Related U.S. Application Data

(60) Provisional application No. 61/451,327, filed on Mar. 10, 2011.

(51) Int. Cl.
*G06F 1/12* (2006.01)
*G06F 9/46* (2006.01)
*G06F 9/50* (2006.01)
*G06F 9/52* (2006.01)

(52) U.S. Cl.
CPC .............. *G06F 9/5083* (2013.01); *G06F 9/522* (2013.01); *G06F 9/5088* (2013.01)

(58) Field of Classification Search
CPC ...... G06F 9/5083; G06F 9/5088; G06F 9/522

USPC ................. 718/102, 104, 105; 713/375, 400; 716/123
See application file for complete search history.

(56) References Cited

U.S. PATENT DOCUMENTS 6,292,822 B1 * 9/2001 Hardwick ...................... 718/105
7,370,328 B2 * 5/2008 Yamada et al. ............... 718/105
(Continued)

OTHER PUBLICATIONS

Bonorden, O. "Load Balancing in the Bulk-Synchronous-Parallel Setting Using Process Migrations" Proceedings of the International Parallel & Distributed Processing Symposium (IPDPS07, HCW07). Mar. 2007. (9 Pages).
Eggen, M., et al. "Load Balancing on a Non-Dedicated Heterogeneous Network of Workstations" Proceedings of the International Conference on Parallel and Distributed Processing Techniques and Applications. Jun. 2002. (7 Pages).
(Continued)

*Primary Examiner* — Meng An
*Assistant Examiner* — Abu Ghaffari
(74) *Attorney, Agent, or Firm* — Joseph Kolodka (57) ABSTRACT

Methods and systems for managing data loads on a cluster of processors that implement an iterative procedure through parallel processing of data for the procedure are disclosed. One method includes monitoring, for at least one iteration of the procedure, completion times of a plurality of different processing phases that are undergone by each of the processors in a given iteration. The method further includes determining whether a load imbalance factor threshold is exceeded in the given iteration based on the completion times for the given iteration. In addition, the data is repartitioned by reassigning the data to the processors based on predicted dependencies between assigned data units of the data and completion times of a plurality of the processers for at least two of the phases. Further, the parallel processing is implemented on the cluster of processors in accordance with the reassignment.

14 Claims, 7 Drawing Sheets

(56) References Cited

U.S. PATENT DOCUMENTS

| | | | |
|---|---|---|---|
| 8,091,078 B2 * | 1/2012 | Brokenshire et al. | 717/143 |
| 2002/0156932 A1 * | 10/2002 | Schneiderman | 709/317 |
| 2010/0095303 A1 * | 4/2010 | Archer et al. | 718/105 |
| 2010/0251258 A1 * | 9/2010 | Hanamori et al. | 718/105 |
| 2011/0231856 A1 * | 9/2011 | Son et al. | 718/103 |

OTHER PUBLICATIONS

Pellegrini, F. "Scotch and Libscotch 5.1 User's Guide" Universite Bordeaux I. Nov. 2010. pp. 1-140.

* cited by examiner

LOAD BALANCING ON HETROGENOUS PROCESSING CLUSTER BASED ON EXCEEDED LOAD IMBALANCE FACTOR THRESHOLD DETERMINED BY TOTAL COMPLETION TIME OF MULTIPLE PROCESSING PHASES

RELATED APPLICATION INFORMATION

This application claims priority to provisional application Ser. No. 61/451,327 filed on Mar. 10, 2011, incorporated herein by reference.

BACKGROUND

1. Technical Field

The present invention relates to processing on heterogeneous clusters and, more particularly to parallel execution on heterogeneous processing clusters.

2. Description of the Related Art

Iterative methods are used in a wide variety of scientific and high performance computing (HPC) applications. An iterative method is essentially a computational procedure that generates a sequence of improving solutions for a problem. When the sequence converges to a final solution, the method is referred to as an iterative convergence method. Algorithms such as gradient descent, simulated annealing and numerous others are based on iterative convergence.

Typically, scientific and HPC applications that employ iterative methods are parallelized and deployed on high-end compute clusters. An example of such an application is the Open Field Operation and Manipulation (OpenFOAM) application, which is an open-source Computational Fluid Dynamic (CFD) toolbox for simulating fluid flow problems. The numerical solvers in OpenFOAM are available as parallelized implementations for homogeneous central processing unit (CPU)-based clusters. It can be used to build applications for simulating fluid flow and has an extensive range of features to solve complex problems ranging from chemical reactions, turbulence and heat transfer, to solid dynamics. Generally, CFD simulations in such application domains are carried out on high-performance compute clusters because they need large computational and memory capabilities and possibly large amounts of storage as well.

SUMMARY

One embodiment is directed to a method for managing data loads on a cluster of processors that implement an iterative procedure through parallel processing of data for the procedure. The method includes monitoring, for at least one iteration of the procedure, completion times of a plurality of different processing phases that are undergone by each of the processors in a given iteration. The method further includes determining whether a load imbalance factor threshold is exceeded in the given iteration based on the completion times for the given iteration. In addition, the data is repartitioned by reassigning the data to the processors based on predicted dependencies between assigned data units of the data and completion times of a plurality of the processors for at least two of the phases. Further, the parallel processing is implemented on the cluster of processors in accordance with the reassignment.

An alternative embodiment is directed to a computer readable storage medium comprising a computer readable program. The computer readable program when executed on a computer causes the computer to perform a method for managing data loads on a cluster of processors that implement an iterative procedure through parallel processing of data for the procedure. The method includes monitoring, for at least one iteration of the procedure, completion times of a plurality of different processing phases that are undergone by each of the processors in a given iteration. The method further includes determining whether a load imbalance factor threshold is exceeded in the given iteration based on the completion times for the given iteration. In addition, the data is repartitioned by reassigning the data to the processors based on predicted dependencies between assigned data units of the data and completion times of a plurality of the processors for at least two of the phases.

Another embodiment is directed to a system for managing data loads. The system includes a cluster of processors, a data repartitioner module and a balancer module. The cluster of processors is configured to implement an iterative procedure through parallel processing of data for the procedure. The data repartitioner module is configured to partition and assign the data to the processors for the parallel processing. Further, the balancer module is configured to, for at least one iteration of the procedure, monitor completion times of a plurality of different processing phases that are undergone by each of the processors in a given iteration of the at least one iteration. The balancer module is also configured to determine whether a load imbalance factor threshold is exceeded in the given iteration based on the completion times for the given iteration. Moreover, the balancer module is further configured to direct the data repartitioner module to repartition the data by reassigning the data to the processors based on predicted dependencies between assigned data units of the data and completion times of a plurality of the processors for at least two of the phases.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As indicated above, applications that employ iterative methods are often parallelized and deployed on high-end compute clusters. However, even with a high-end CPU-based cluster, application performance can scale poorly with problem size. For example, for modest to large sized problems, it has been observed that an OpenFOAM-based application that tracks the interface between two incompressible fluids took several hours to a few days to complete. This performance issue can be addressed by utilizing graphics processing units (GPUs) as co-processors or accelerators in high-performance compute clusters. When an iterative convergence process is parallelized, it creates parallel tasks that communicate with each other. The performance of such a parallelized job is optimal when the running times of all parallel tasks (i.e., computation and communication) are roughly equal. However, heterogeneous clusters have compute nodes of varying capabilities due to the use of accelerators on only some nodes or the use of processors from different generations, among other reasons. This causes an imbalance resulting in some parallelized tasks finishing faster and waiting for other tasks to complete.

In accordance with aspects of the present principles, the efficiency of parallelized processing on heterogeneous processing clusters can be improved by employing novel load balancing methods and systems. In particular, embodiments perform automatic load balancing for parallelized iterative convergence processes implemented on a heterogeneous cluster, for example, a cluster with an imbalance in computation and communication capabilities.

When iterative convergence is parallelized, each parallel task consists of computation, communication and waiting phases. More specifically, a task performs a computation, sends messages to other nodes, waits and receives messages from other nodes, computes local convergence criteria, broadcasts convergence information, waits and receives convergence information from other nodes and then encounters a synchronization barrier. To ensure that the waiting phases are minimized, embodiments employ a runtime strategy to continuously measure the computation, communication and wait times on each node, as well as the amount of communication. An analytical function of the measurements can be applied to determine how to repartition input data so that waiting time for the different parallel iterations is minimized. The process iterates until a stable balance is achieved.

In accordance with exemplary aspects, the embodiments described herein can apply an analysis of different processing phases undergone by processing nodes to optimize the repartitioning of the data. In addition, to further improve the repartition decisions, an imbalance factor can be employed that is based on wait times within iterations and is normalized by a total iteration time that accounts for the different processing phases. Moreover, the imbalance factor can include a multiplier that ensures the detection of cases in which the processing nodes appear to be balanced but the wait times themselves are excessively high. Features also include the use of a time estimation model that predicts dependencies between data units processed and completion for the different processing phases. The use of the phase-specific dependencies permits the determination of a minimal amount of data to be reassigned from one processor to another to achieve a substantial balancing effect per data unit transferred. This is desirable, as the reassignment of data itself may be time consuming and the iterative method can converge in a shorter amount of time with minimized data reassignment.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output (I/O) devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

1. Overview of Parallel Execution Application Example

As indicated above, OpenFOAM is an example of an application that implements parallel execution and is used here to illustrate aspects of the present principles. As such, prior to discussing features of the present principles in detail, a brief overview of OpenFOAM is provided for expository purposes.

The OpenFOAM CFD Toolbox is an open source CFD software package. It is utilized in most areas of engineering and science and supports an extensive range of features to solve problems related to complex fluid flows involving chemical reactions, turbulence, heat transfer, solid dynamics and electromagnetics. The core technology of OpenFOAM is a flexible set of efficient C++ modules, which can be used to build solvers to simulate specific problems in engineering mechanics. It is also possible to develop utilities to perform pre- and post-processing tasks ranging from simple data manipulations to visualization and mesh processing. OpenFOAM includes pre-configured solvers, utilities and libraries. Due to its flexible structure and hierarchical design, OpenFOAM solvers, utilities and libraries are fully extensible. The application uses finite volume numerics to solve systems of partial differential equations ascribed on any three-dimensional unstructured mesh of polyhedral cells. The fluid flow solvers are developed within a pressure-velocity iterative solution framework, although alternative techniques are applied to continuum mechanics solvers.

The broad physical modeling capabilities of OpenFOAM have been used by the aerospace, automotive, biomedical, energy and processing industries. OpenFOAM comprises a suit of solvers for physical modeling: laplacianFoam solves a simple Laplace equation, e.g. for thermal diffusion in a solid; icoFoam is a transient solver for incompressible and laminar flow of Newtonian fluids; interFoam is a solver for two incompressible and isothermal immiscible fluids using a VOF (volume of fluid) phase-fraction based interface capturing approach. There are a number of solvers related to combustion, heat transfer, buoyancy-driven flows, particle-tracking flows and electromagnetism.

1.1 InterFoam Application Solver

Many of the different solvers in OpenFOAM follow a similar computation and communication structure characterized by sparse linear algebra, domain decomposition and iterative convergence. These solvers share a set of basic modules and InterFoam is utilized here a representative solver. InterFoam is a solver for two incompressible fluids, which tracks the interface between the fluids and includes the option of mesh motion. It is an unsteady solver and is based on a PISO (Pressure Implicit with Splitting of Operators) algorithm. The PISO algorithm is an efficient method to solve the Navier-Stokes equations in unsteady problems.

In order to identify potential candidates for offloading processing on GPUs implemented as co-processors, the InterFoam solver can be profiled with the callgrind profiling tool. Profiling of the application gives useful insight about computational intensive methods in the application. Further analysis is applied to determine communication overheads and identification of data parallelism. Based on the analysis, it is believed that the granularity of parallel execution methods should change in some circumstances. Instead of parallelizing low level methods, it is at times beneficial to parallelize higher level functions in the call graph in order to minimize communication between CPUs and GPUs.

Figure 1:
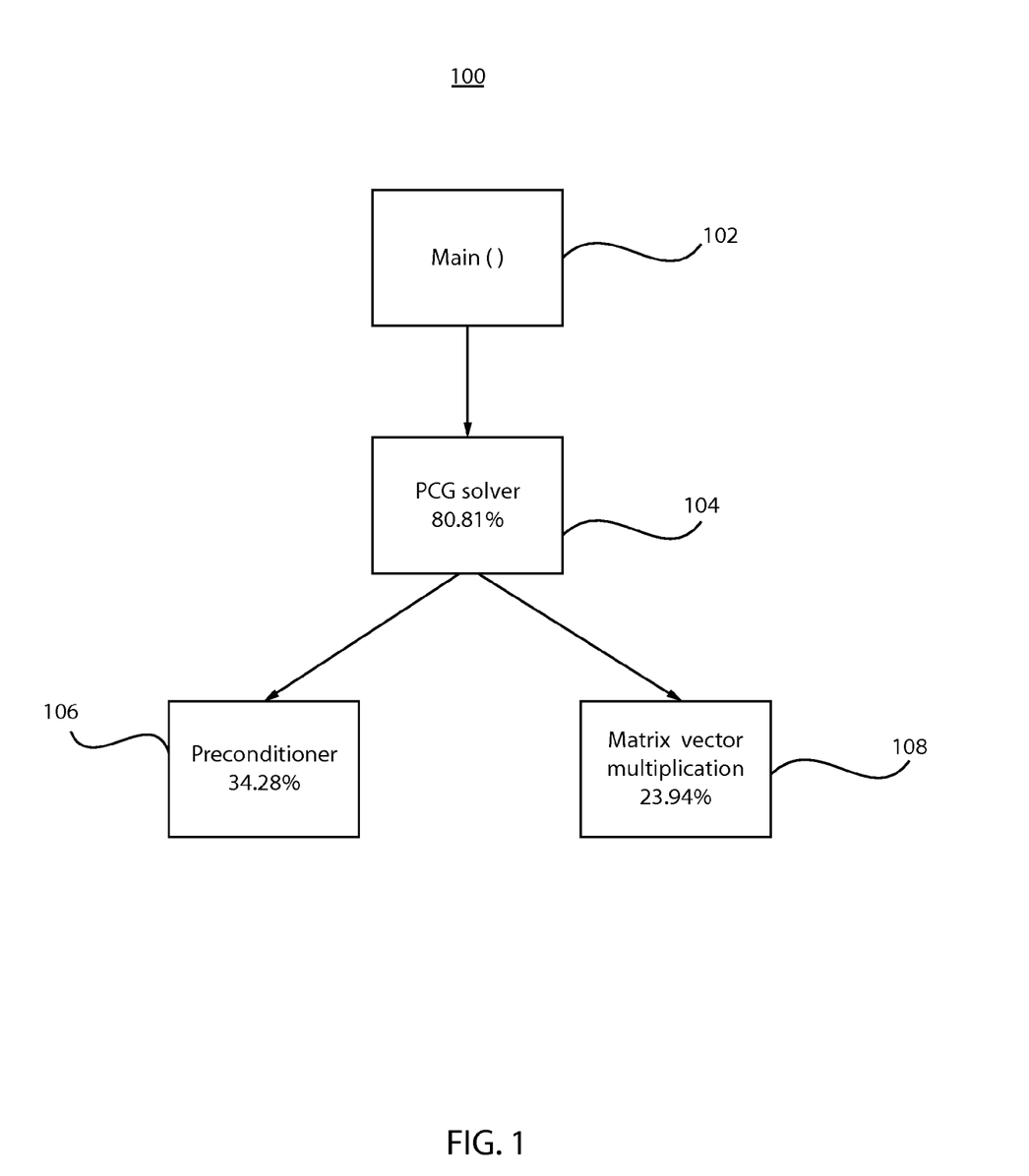
FIG. 1 is a block diagram of a profile of an InterFoam solver indicating the amount of computation performed by portions of the solver.

FIG. 1 illustrates the profiling results 100 of the InterFoam solver, which includes a main function 102, a Preconditioned Conjugate Solver (PCG) 104, a preconditioner 106 and a matrix vector multiplication module 108. It can be observed that diagonal preconditioning (precondition( )) 106, consuming 34.28% of the time spent by InterFoam, and Matrix-vector product (Amul( )) 108, consuming 23.94% of the time spent by InterFoam, are computationally intensive and can be potential candidates for offloading the processing to the graphics processing unit (GPU) co-processor. On further analysis, it is clear that performing preconditioning and matrix-vector computation on the GPU would need additional data to be transferred per iteration between the CPU and GPU, thereby increasing communication overhead. In order to avoid the large amount of data transfer per iteration, the execution can be implemented at a higher granularity and the entire PCG solver 104 can be parallelized on the GPU co-processor. The PCG solves set of linear equations Ax=b. Apart from the fact that PCG solver is computationally intensive and consumes 80% of the time spent by InterFoam processing, it was observed that the PCG solver is commonly used in other parts of OpenFOAM as well. Hence, accelerating PCG by offloading to a GPU would have a significant impact on OpenFOAM performance 1.2 PCG Solver The preconditioned conjugate gradient method is an iterative algorithm for solving linear systems. It is used to compute a numerical solution of particular systems of linear equations, such as those whose matrix is symmetric and positive-definite. The preconditioning leads to a faster propagation of information through the computational mesh. Because the conjugate gradient method is an iterative method, it can be applied to sparse systems that are too large to be handled by direct methods, such as the Cholesky decomposition. Such systems often arise when numerically solving partial differential equations. The matrix is constrained to be symmetric and positive definite for the conjugate gradient method to converge. With given input vectors $x_0$ and b, the solution of Ax=b is obtained with the PCG algorithm and a diagonal preconditioner, as shown below in Table 1. The residual vector r is defined as r=b−Ax. In each iteration, the vectors x and r are computed and the residual vector r is compared with convergence criterion to indicate whether the iteration has produced a result that is closer to the actual solution x.

TABLE 1

PCG Algorithm

1 $x_0$ = initial guess
2 $r_0 = b - Ax_0$
3 $p_{-1} = 0, \beta_{-1} = 0$
4 Solve for $w_0$ in $Kw_0 = r_0$ (Preconditioning)
5 $\rho_0 = r_0 \cdot w_0$
6 for i = 0, 1, 2...
7 $p_i = w_i + \beta_{i-1} p_{i-1}$
8 $q_i = Ap_i$
9 $\alpha_1 = \rho_i / p_i \cdot q_i$
10 $x_{i+1} = x_i + \alpha_1 p_i$
11 $r_{i+1} = r_i - \alpha_1 q_i$
12 if $x_{i+1}$ accurate enough then quit
13 Solve for $w_{i+1}$ in $Kw_{i+1} = r_{i+1}$
14 $\rho_{i+1} = r_{i+1} \cdot w_{i+1}$
15 $\beta_i = \rho_{i+1} / \rho_i$
16 end 2. CPU-Based Homogeneous Cluster.

The model of parallel computation used by OpenFOAM is referred to as domain decomposition, in which the mesh and associated fields are partitioned and allocated to separate tasks, which are then assigned to different processing units using a Message Passing Interface (MPI) system. OpenFOAM provides multiple options for domain decomposition. In one exemplary implementation, Scotch partitioning is employed, as it attempts to minimize the number of processor boundaries (i.e sync points between processors) and provides the capability of assigning weights to processors based on their computation capabilities.

For the algorithm shown above in Table 1, each processor computes vector p (line 7), and then sends part of p to a predefined neighbor(s) based on the partitioning scheme. Simultaneously, the processor computes vector q based on its locally computed value of p. Once all processors receive portions of vector p from other processors, they incrementally update their computed value of q. Once p and q are determined, the intermediate solution x and the residual r are computed. Each processor then communicates its residual r to other processors and global convergence is decided. Table 2, below presents the computations time for InterFoam on a homogeneous cluster. Each node in the cluster contains a Quad-core Xeon E5620 2.4 GHz processor and 48 GB RAM. The problem is decomposed into smaller sub-domains; each MPI process performs computations on a sub-domain and communicates intermediate results with neighboring nodes. As evident from the table, there is a sharp increase in computation time with increasing problem size (i.e input data size). As indicated above, computation on a large data set can take days to complete.

TABLE 2

Performance benchmarking results on CPU-based homogeneous cluster

| PROBLEM SIZE | TIME (SECONDS) | |
|---|---|---|
| | 2 Nodes (8-cores) | 3 Nodes (12-cores) |
| 159500 | 36 | 32 |
| 318500 | 82 | 70 |
| 637000 | 337 | 222 |
| 955000 | 729 | 498 |
| 2852160 | 11362 | 9680 |

3. GPU-Based Cluster

As indicated above, GPUs can be employed to accelerate applications, such as applications characterized by iterative convergence, sparse matrix computations, and domain decomposition. Methods for porting InterFoam to GPU-based clusters are described herein below.

While dense linear algebra computations benefit significantly from GPUs, sparse linear algebra computations within the context of a large application present more challenges, such as irregular data accesses. An important feature pertaining to OpenFOAM is the presence of sparse matrix computations within the context of the iterative convergence method, which is how solvers are implemented. Not only are there irregular accesses within an iteration leading to possibly limited parallelism, but there may be successive iterations that cannot be run in parallel. Nonetheless, for sufficiently large problem sizes, the GPU-based cluster does show overall speedups.

Peripheral controller interface (PCI)-related additional data communication overheads pertaining to the GPU, specifically when iterative convergence is parallelized on a GPU cluster, should also be considered. Parallelizing iterative convergence results in local tasks on GPU nodes that communicate with each other on every iteration to correctly achieve global convergence. With the GPU, this communication not only has to traverse the network stack of each node, but also the PCI bus.

The problem of domain decomposition (i.e. data partitioning) is exacerbated in a cluster composed of heterogeneous processing units including GPUs with varying compute capabilities. As discussed in further detail herein below, load balancing methods and systems in accordance with the present principles can be employed to enable efficient implementation of data partitioning.

3.1 Homogeneous GPU-Based Cluster

As mentioned above, each MPI process performs computations on a sub-domain of the complete mesh. To utilize the GPU on the machine, an MPI process can offload parts of the computation to the GPU. This can be done by identifying code sections that can benefit from executing on the GPU and rewriting them using Compute Unified Device Architecture (CUDA) kernels. After profiling and experimentation, it can be shown that, for the InterFoam application, it is beneficial to offload the entire PCG solver to the GPU. Offloading only data-parallel parts of the PCG solver had led to poor performance due to high communication overheads between the CPU and GPU. The CUDA Sparse Matrix (CUSPARSE) library, which provides fast implementation of sparse matrix operations, can be used for implementing the PCG solver in CUDA.

OpenFOAM solvers use the LDU matrix format to store sparse matrices produced from the mesh, while the CUSPARSE library uses a compressed sparse row (CSR) format. In order to be able to use CUSPARSE, an LDU-to-CSR format converter can be developed and employed.

First, each MPI process sets an appropriate CUDA device. Then, all LDU matrices are converted to CSR format. Thereafter, the algorithm proceeds as follows in Table 3.

TABLE 3

1. Matrix A, and input vectors b and $x_0$ are transferred to GPU memory.
2. For each MPI process until convergence:
   A CUDA kernel is launched to compute diagonal preconditioning (Eq. 4 and Eq. 13 in Table 1).
   Relevant CUDA Basic Linear Algebra Subroutines (CUBLAS) Application Programming Interfaces (APIs) are invoked for solving Eq. 5, Eq. 7, Eq. 9-11 and Eq. 14 in Table 1. In addition, relevant CUSPARSE APIs are invoked to solve Matrix-vector product (Eq. 8) in Table 1.
   Whenever communication across processor boundaries is needed, updated vectors p and q should be present in CPU memory. In order to reduce the communication overhead over PCI express, CUDA kernels are launched to perform a gather and scatter operation on the portion of vector p and q.
3. Vector x is transferred to the CPU memory.

It can be shown that, for large data sets, the GPU-based cluster outperforms CPU-based cluster, while for smaller data sets, the CPU-based cluster provides better performance. This is because, for relatively large data sets, the communication overhead between CPU and GPU portions is more than compensated for by the compute acceleration obtained with the GPU. In turn, for smaller data sets, the communication overhead dominates.

3.2 Heterogeneous Clusters with Different GPUs and Dynamic Data Partitioning As mentioned above, OpenFOAM employs task parallelism, where the input data is partitioned and assigned to different MPI processes. For a homogeneous cluster of CPUs and GPUs, a uniform data partitioning scheme would suffice. However, a uniform data partitioning scheme will not suffice for clusters where some nodes do not have GPUs or the GPUs have different compute capabilities. In such heterogeneous clusters, a uniform domain decomposition and data partitioning scheme can lead to imbalance and suboptimal performance.

Figure 2:
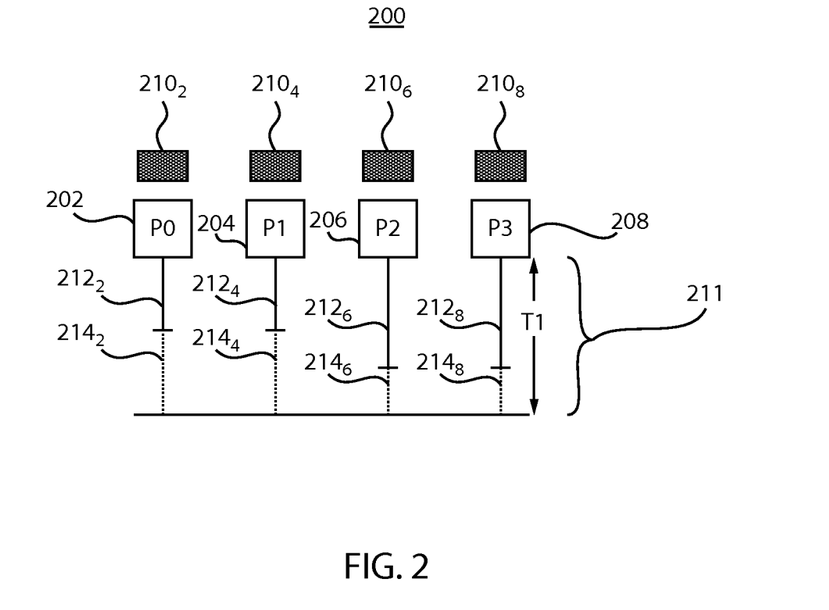
FIG. 2 is a block diagram illustrating an imbalance between processors performing parallelized execution of an iterative procedure.
Figure 3:
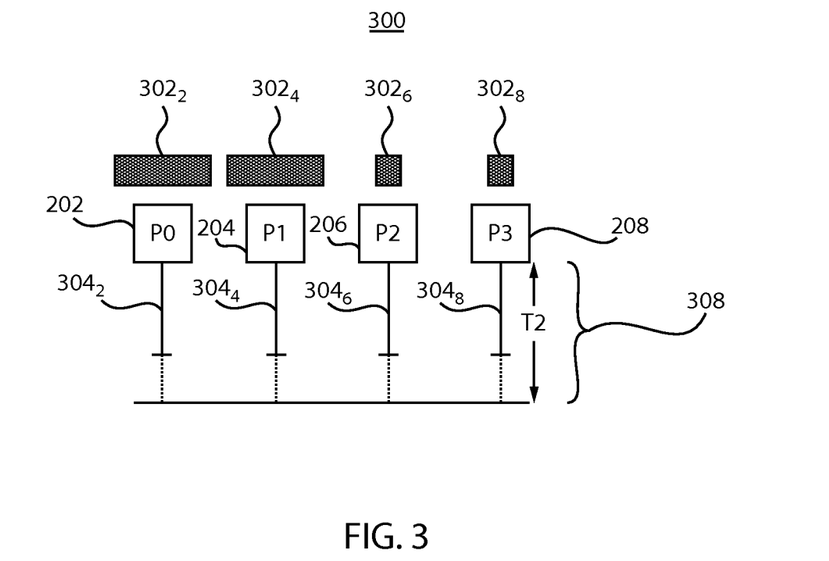
FIG. 3 is a block diagram illustrating the effects of a repartitioning scheme in accordance with an exemplary embodiment on the imbalance between the processors of FIG. 2.

FIGS. 2 and 3 provide diagrams 200 and 300 that respectively illustrate imbalanced parallel processing and relatively balanced parallel processing in accordance with a dynamic data partitioning scheme. For example, in FIG. 2, four MPI processes P0, P1, P2 and P3 are performed by a set of processor nodes that have heterogeneous processing capabilities. Here, the processor nodes 202 and 204 are CPUs that offload computations to Fermi GPUs. In addition, processor nodes 206 and 208 continue to run on CPU cores due to the absence of GPUs. The processor nodes 202, 204, 206 and 208 respectively process data sets $210_2$, $210_4$, $210_6$ and $210_8$. T1, denoted by element 211, is the total processing time for all of the nodes. The total processing time for node 202 is comprised of the time $212_2$ that the node 202 spends on performing computations and of the time $214_2$, which includes the time that the node 202 waits for the other nodes to complete their respective processes. Similarly, the total processing time for node 204 is comprised of the time $212_4$ that the node 204 spends on performing computations and of the time $214_4$, which includes the time that the node 204 waits for the other nodes to complete their respective processes, the total processing time for node 206 is comprised of the time $212_6$ that the node 206 spends on performing computations and of the time $214_6$, which includes the time spent on communicating with other nodes, and the total processing time for node 208 is comprised of the time $212_8$ that the node 208 spends on performing computations and of the time $214_8$ that the node 208 communicates with other nodes.

Due to the difference in computation capabilities, processors 202 and 204 complete the computations on data sets $210_2$ and $210_4$ assigned to them and wait for processors 206 and 208 to finish their computations, resulting in suboptimal performance.

For applications such as OpenFOAM, where compute time is dependent on the data size, the above-mentioned problem can be solved if the workload/data is divided based on the compute capabilities of the processing units involved. One way to accomplish this is to characterize the cluster by profiling it statically and generating a map of relative computation power for the different nodes involved, and then using this information for generating data partitions. However, this simplistic approach has several limitations. First, a cluster profile generated without running the application under consideration is likely going to be inaccurate in predicting optimal data partitioning for the application, more so for a cluster of heterogeneous CPUs with different memory bandwidths, cache levels and processing elements. Second, in the case of multi-tenancy where applications share resources in the cluster, it would be difficult to predict the execution time of an application statically. Third, a data-aware scheduling scheme, where the selection of computation to be offloaded to the GPU is done at runtime, if employed, would add to the complexity of estimating data partitions statically.

As such, in accordance with aspects of the present principles, a dynamic data partitioning scheme can be employed, where a run-time balancer analyzes the discrepancy in the computation and communication patterns of different MPI processes and directs the repartition of the data set accordingly. For example, assume P0 is a master process with P1, P2 and P3 as slave processes. After running for a fixed number of iterations, the slave processes send their own timing profiles (computation and communication time) to the master process. The master process observes the computation and communication pattern for each process and suggests a new partitioning ratio to balance the computation across the processes to achieve optimal performance. FIG. 3 illustrates an example of such a repartitioning.

With reference to FIG. 3, the repartition can assign larger data blocks $302_2$ and $302_4$ (as compared to blocks $210_2$ and $210_4$) to processor nodes 202 and 204, respectively, and can assign smaller data blocks $302_6$ and $302_8$ (as compared to blocks $210_6$ and $210_8$) to processor nodes 206 and 208, respectively. The total processing time for all of the nodes T2, denoted by element 308, is less than time 211. This is due to the relative parity of the computation times $304_2$, $304_4$, $304_6$, $304_8$ of the nodes 202, 204, 206 and 208, respectively.

To perform dynamic repartitioning, the runtime analyzer or balancer can observe the computation and communication pattern for each process for a fixed number of iterations and can suggest a new partitioning ratio. It can then direct the repartitioning of the workload and the application is made to run with the repartitioned workload.

4. Data Load Management Systems and Methods for Parallelized Iterative Processing To implement the dynamic repartitioning described above, system and method embodiments for managing data loads on a cluster of processors that implement an iterative procedure through parallel processing can be employed. The systems and methods described herein below can be applied to any cluster with heterogeneous processing and/or communication capabilities that is utilized for iterative procedures. The OpenFOAM, CPU/GPU heterogeneous example is only one illustrative environment in which the systems and methods can be employed.

As indicated above, iterative methods are those that produce a sequence of improving approximate solutions to a problem. They start with an initial data set ('model') and continuously refine it over the course of several iterations. Examples of widely-used algorithms that employ iterative methods are gradient descent, simulated annealing, k-means, and many others.

For illustrative purposes, the methods and systems discussed herein below are described with respect to stationary iterative methods that perform the same operations every iteration. Here, an iteration is comprised of two phases: a COMPUTE phase during which the model is transformed using computing operations performed by the processor, and a CONVERGENCE CHECK phase, which determines if the refinements performed on the model are sufficient to terminate the algorithm.

The systems and methods described herein can be applied to systems that parallelize iterative methods across N distributed processing nodes. The processing nodes can be processing nodes with no shared memory, such as those found in a compute cluster. In order to enable such a parallelization, the initial model data is split across the processing nodes. An iteration on each processing node now performs the COMPUTE phase on its local model data, but communicates and synchronizes with other processing nodes to correctly evaluate the global termination condition. For example, consider the k-means algorithm, which starts with an initial model consisting of n points and k means. During each iteration, for each mean $m_i$, the sequential algorithm finds the subset of the n points for which $m_i$ is the closest mean. It then averages these points to produce a new value for $m_i$. When k-means is parallelized, each processing node only sees a portion of the n points, and computes k means based on that local data, but all processing nodes have to communicate their locally computed means to each other to determine if the algorithm has globally converged.

Figure 4:
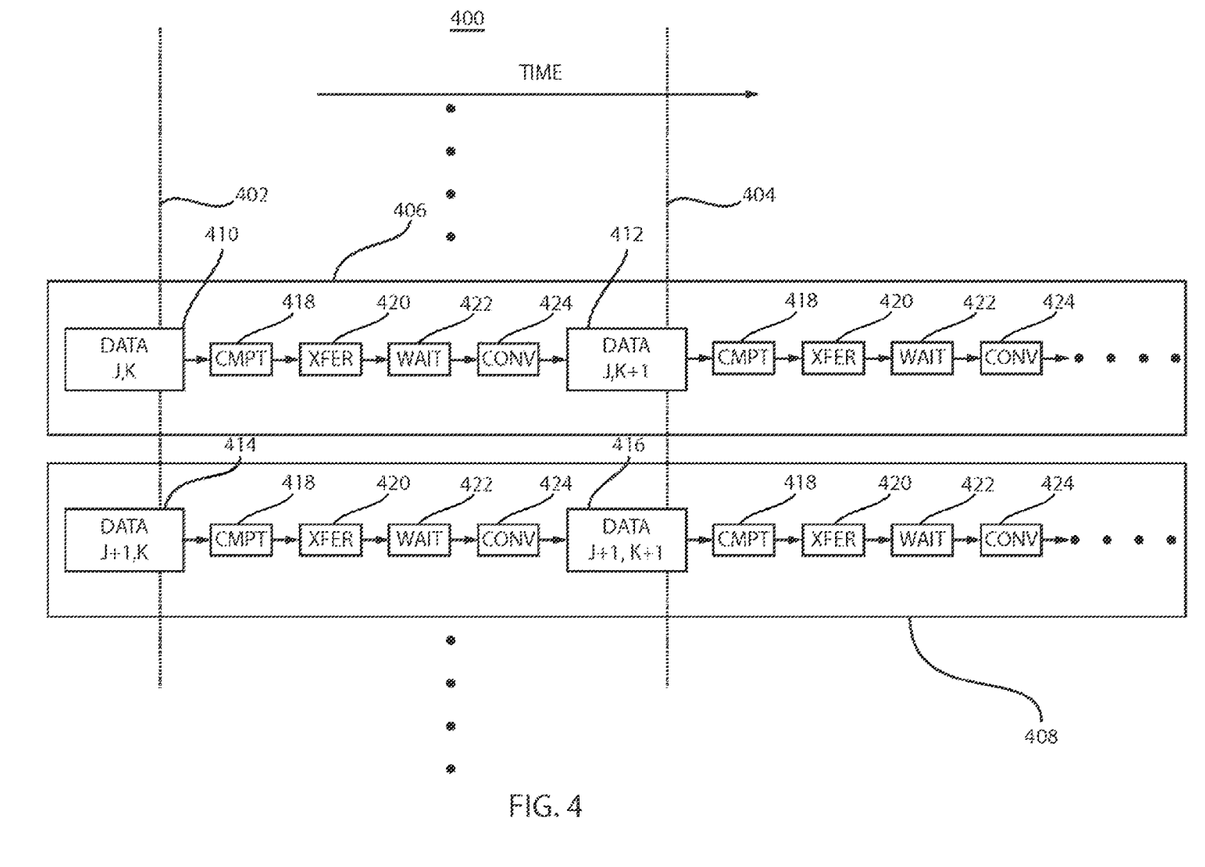
FIG. 4 is block/flow diagram illustrating aspects of parallelized processing of an iterative procedure.

Inter-node communication need not occur only during the global convergence check. Depending on the type of operations, parallelizing the COMPUTE phase itself may involve communication between processing nodes. In general, each iteration, on one processing node, within a parallelized iterative framework consists of processing phases which may be classified as one of the following classes of phases: a) COMPUTE (CMPT) 418: phases in which local computation is performed on the processing node; b) DATA TRANSFER (XFER) 420: phases in which data transfer is performed between this processing node and other processing nodes; c) SYNCHRONIZATION (WAIT) 422: phases during which this processing node waits for other processing nodes; and CONVERGENCE CHECK (CONV) 424: phase during which this processing node checks its local convergence criteria. Where processing nodes are configured to offload computations to an accelerator, these phases inherently incorporate the communication time between the host processor node and the accelerator.

The convergence check, and the parallelization, enforces a global barrier at the end of every iteration. FIG. 4 is a diagram 400 that shows the different phases in a parallelized iterative method, where a processing node J, denoted by block 406, refines model data DATA J,K 410 during iteration K 402 and produces refined model DATA J,K+1 412 during iteration K+1 404. The diagram also illustrates a processing node J+1, denoted by block 408, that refines model data DATA J+1,K 414 during iteration K 402 and produces refined model DATA J+1,K+1 416 during iteration K+1. The processing nodes 1 to J−1 and J+2 to N similarly undergo the processing phases.

A parallelized iterative method is balanced when each processing node's iterations involve similar amounts of CMPT and XFER, thereby reaching the global barrier at roughly the same time as any other processing node's iterations. Imbalance occurs when one of the processing node's CMPT phases complete faster than another processing node's CMPT phases, or if one processing node spends more time in communicating data (XFER phase) than another processing node. Due to the global barrier enforced by the convergence check after every iteration, imbalance results in different SYNCHRONIZATION or wait times across processing nodes. That is, the faster processing node or the processing node performing less data transfer spends more time waiting for the other processing nodes to reach the barrier.

Imbalance in parallelized iterative methods is caused primarily by two factors: hardware heterogeneity and data irregularity. With regard to hardware heterogeneity, nodes in the cluster have different processing, memory and I/O capabilities. For example, some processor nodes may have faster CPUs, more memory or many-core accelerators like GPUs, while others may not. Accelerators themselves can be of different types and speeds, such as the NVIDIA Tesla and Fermi devices, and the Intel MIC. With regard to data irregularity, although the amount of local model data for two iterations may be the same, the application's access patterns may be irregular or sparse, resulting in different processing times for the same amount of data.

The systems and methods described herein below provide a mechanism to automatically identify and rectify imbalance in parallelized iterative methods on heterogeneous clusters. The methods do not require a priori knowledge of either the application or the hardware used in the clusters.

In accordance with exemplary aspects of the present principles, imbalance can be reduced by minimizing the WAIT phase time for each processing node in a cluster. Reducing the wait time automatically adjusts the CMPT and XFER phases so that all processing nodes will reach the global barrier at the end of each iteration at roughly the same time, thereby improving the overall balance. Here, the imbalance is quantified by defining an imbalance factor, $IF_K$, for the cluster during iteration K:

$$IF_K = \frac{W_{max}^K - W_{min}^K}{T_K} * W_{max}^K$$

where $W_{max}^K$ and $W_{min}^K$ respectively represent the maximum and minimum waiting times across all processors in the cluster for iteration K, and $T_K$ represents the time for iteration K. The imbalance factor primarily depends on the difference between the maximum and minimum wait times ($W_{max}^K - W_{min}^K$). The denominator $T_K$ normalizes the imbalance to the total iteration time, making the imbalance factor high only if the difference is large and a significant portion of the total iteration time. The multiplier $W_{max}^K$ ensures that the imbalance factor is high even if the nodes appear to be balanced (i.e., $W_{max}^K - W_{min}^K$ is small) but $W_{max}^K$ and $W_{min}^K$ are individually high. This prevents the solution from converging to a "local minimum" where all nodes wait for each other.

Figure 5:
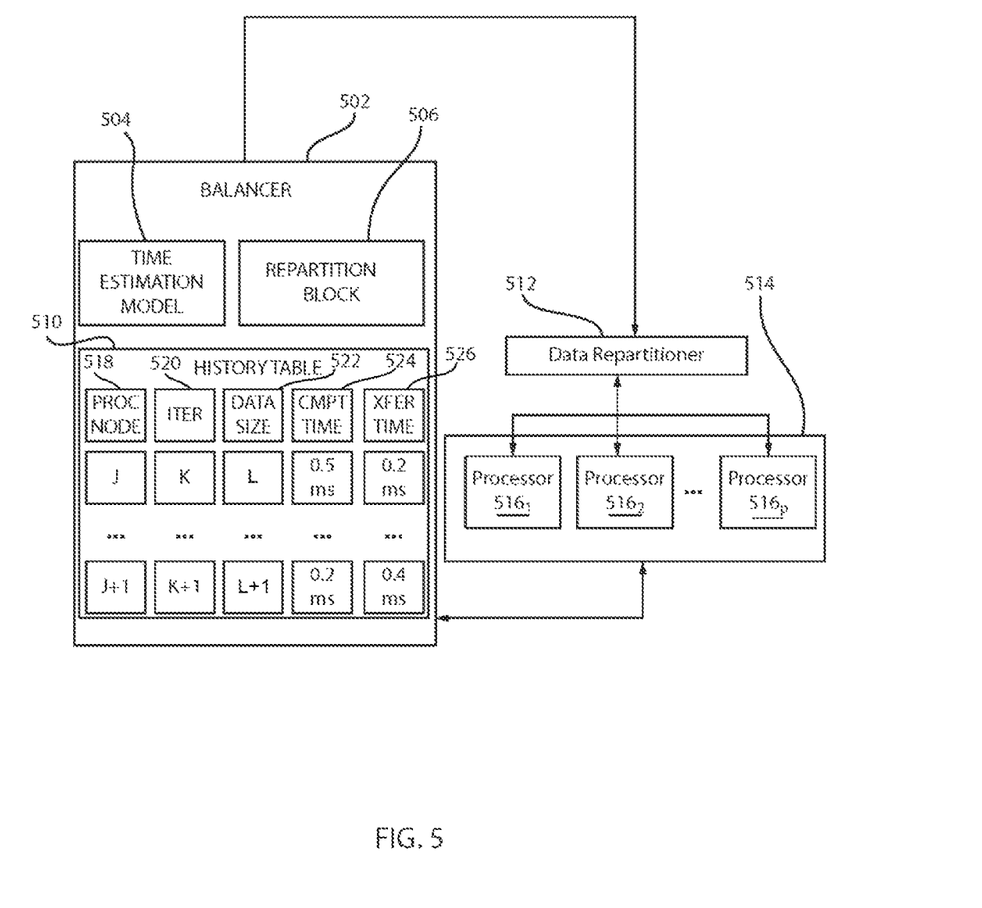
FIG. 5 is a block diagram of a system for managing data loads in accordance with an exemplary embodiment.

With reference now to FIG. 5, an exemplary system 500 for managing data loads on a cluster of processors that implement an iterative procedure through parallel processing is illustratively depicted. The system 500 includes a balancer module 502, a data repartitioner module 512 and a cluster 514 of a set of processors $516_1$-$516_p$. Each of the balancer module 502 and the data repartitioner 512 can be implemented on hardware processors and can be configured to execute program code that is stored on one or more storage mediums and that implements resource management of the cluster of processors 514 in accordance with the methods described herein. The cluster 514 of processors can include processors with heterogenous processing capability and/or speed and/or with heterogenous communication capability and/or speed. For example, as noted above, the processors can include CPUs and CPUs that offload computations to GPUs. In addition, some of the processors in the cluster 514 can be GPUs themselves. The data repartitioner 512 here is part of the application that runs the iterative method on the cluster 514 of processors. In alternative embodiments, the data repartitioner 512 can be implemented in the balancer 502.

Each processor of the cluster 514 can be configured to perform a computation such that the processor operates on its share of data. It then communicates with one or more other processors. This communication involves sending messages and waiting to receive messages from other processors, as noted above. Once this communication phase completes, each processor performs a local convergence test, and communicates this again to other processors. Once global convergence is achieved, all processors stop and the solution is considered acceptable.

For iterative convergence, two types of data can be identified by the data repartitioner 512: the original input data, which is the initial model data, and the model data, which is continuously refined. The data partitioner 512 can implement a given data partitioning. For example, data partitioner 512 can dispatch partitioned input data to all processors and can direct the processors to exchange and reparation their intermediate model data.

The balancer 502 can be configured to request CMPT, XFER, WAIT and CONV time measurements as well as the model data size from the data repartitioner 512, which is configured to partition and assign the data to the processors $516_1$-$516_p$. The balancer 502 can be further configured to issue a repartitioning directive that instructs the application or its data partitioner 512 on how best to repartition the model data.

The balancer 502 can include a time estimation model or module 504, a history table 510 comprised of phase completion times and a repartition block 506. The history table 510 tracks the CMPT time (CMPT TIME) 524 and XFER time (XFER TIME) 526 for each iteration (ITER) 520 on each processing node $516_1$-$516_p$ for a given data size (DATA SIZE) 522. Processing nodes on the history table 510 are identified as PROC NODE 518. Time measurements may be collected by instrumenting the application itself, or by other known means, for example, by intercepting iteration-end barriers. The data size is also expected to be provided by the application on request by the balancer 502. For example, many applications use or can be configured to use a data repartitioner 512, which can be used to provide this information.

The time estimation model or module 504 predicts the CMPT and XFER times for another data size based on CMPT and XFER historical data. A simple linear model can be employed, where for a given processing node, the CMPT and XFER times vary linearly with data size. However, other models can be obtained and utilized by curve-fitting the history table data to, for example, a polynomial model of degree 2. Other models are also possible and may be used.

Figure 6:
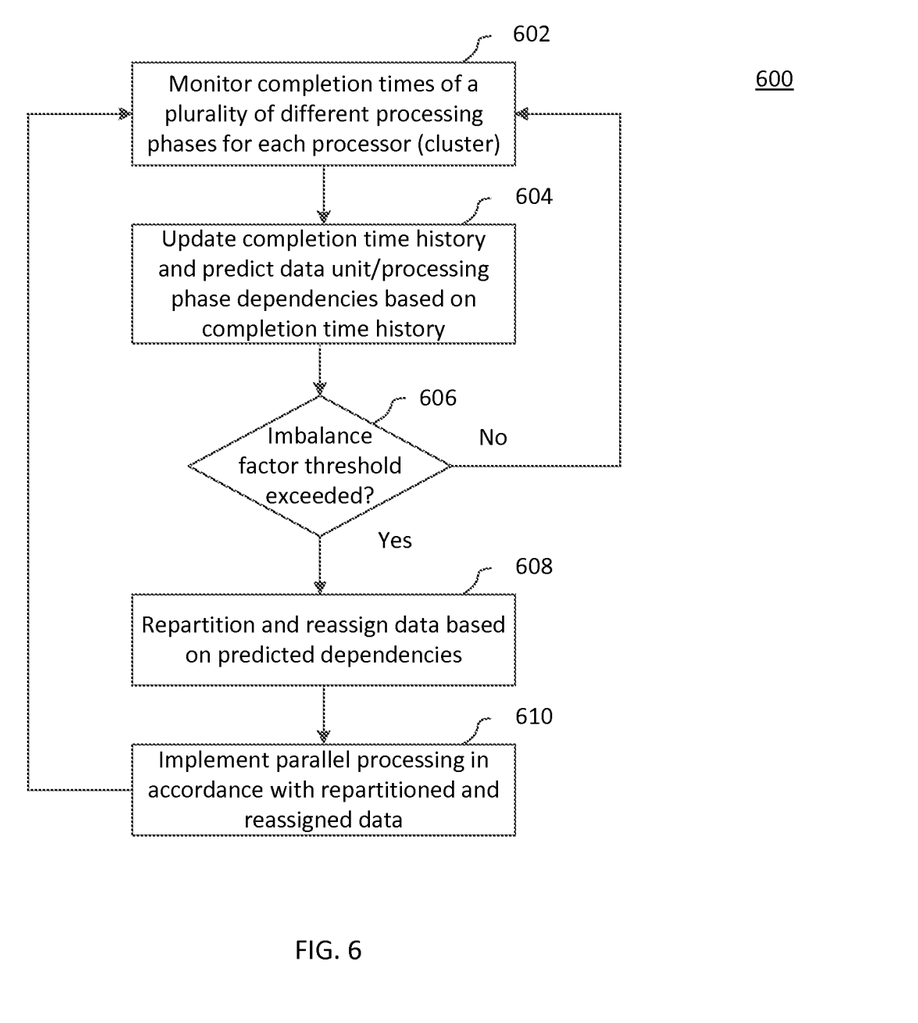
FIG. 6 is a block/flow diagram of a method for managing data loads on a cluster of processors that implement an iterative procedure through parallel processing in accordance with an exemplary embodiment.
Figure 7:
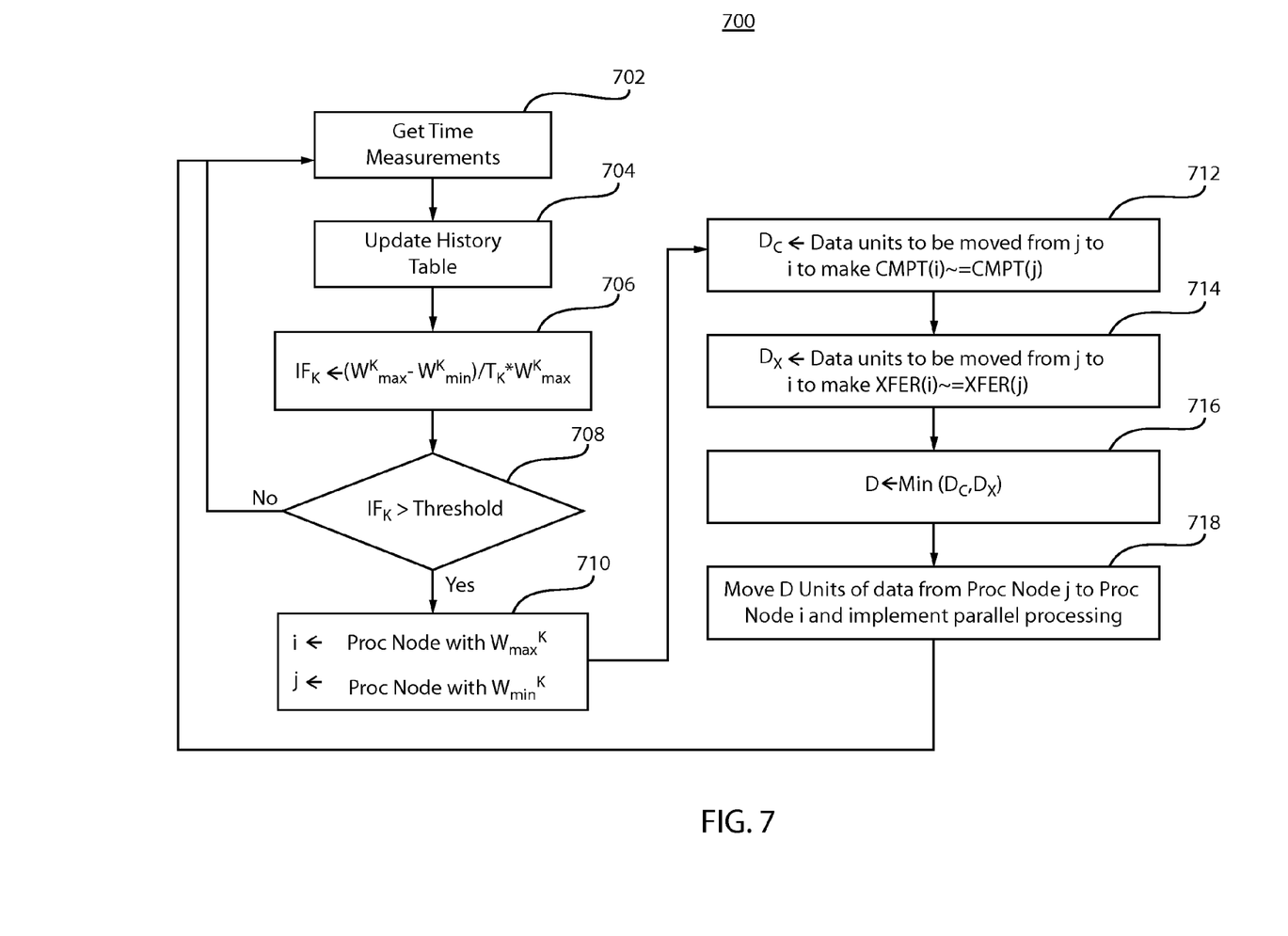
FIG. 7 is a block/flow diagram of an exemplary implementation of the method of FIG. 6 in accordance with an exemplary embodiment.

The repartition or repartitioning block 506 can be configured to implement a method 600 for managing data loads on a cluster of processors that implement an iterative procedure through parallel processing of data for the procedure. The method 600 is illustratively depicted in FIG. 6. Further, a more specific implementation 700 of the method 600 is illustrated in FIG. 7. Reference to both methods is made herein below. Each of the iterations of the methods 600 and 700 can correspond to one or more given iterations of the iterative procedure implemented by the cluster of processors $516_1$-$516_p$. In addition, the static partitioning method described above can be used to initialize the cluster of processors 514 for the iterative procedure prior to the implementation of the methods 600 and 700. Further, it should also be noted that, according to one exemplary aspect, data partitioning in accordance with methods 600 and 700 described herein below can identify the imbalance shortly after an application starts and can restart the application with a better data partitioning. For long running applications, the restarting overhead is minimal. However, the methods can be extended to the case in which the iterative convergence model (intermediate data) is also repartitioned so that the overall computation is not restarted when the data is repartitioned.

The method 600 can begin at step 602, at which the repartition block 506 can, for at least one iteration of the iterative procedure, monitor completion times of a plurality of different processing phases that are undergone by each of the processors in a given iteration. For example, as indicated above, the plurality of different processing phases are successive phases and include a computation phase, a data transfer phase, a synchronization phase and a convergence check phase. In addition, step 602 can be implemented by step 702, where the balancer 502 can request, from the data repartitioner 512 of the application, the time measurements for the completion of each of the phases CMPT, XFER, WAIT and CONY for each of the processors $516_1$-$516_p$. In addition, at steps 602 and 702, the repartition block 406 can also obtain the data size of the data processed by each respective processor $516_1$-$516_p$.

At steps 604 and 704, the repartition block 506 of the balancer 502 can update a completion time history with the received completion times and can predict dependencies between assigned data units of the data processed by the cluster and completion times of a plurality of the processers in the cluster 514 for at least two of the phases based on the completion times monitored for a plurality of iterations of the procedure. For example, the balancer 502 can update the table 510 with the completion times received at steps 602 or step 702. The table 510 can be configured to record completion time histories of several previous runs of the application and/or one or more previous runs of different applications on the cluster 514. Further, the balancer 502 can update the time estimation model 504 with the new completion times. As noted above, the time estimation model 504 can be a simple linear model such that, for a given processing node, the CMPT and XFER times may vary linearly with data size. The time estimation model 504 may track these dependencies for each of the processors $516_1$-$516_p$ so that each processor of the cluster 514 has its own set of dependencies for the various phases of WAIT, CMPT and XFER. Further, the data size can be obtained at steps 602 and 702, as stated above.

At step 606, the repartition block 506 of the balancer 502 can determine whether a load imbalance factor threshold is exceeded in the given iteration based on the completion times for the given iteration. Here, step 606 can be implemented by performing steps 706 and 708 of the method 700. For example, the repartition block 506 can, at step 706, compute the imbalance factor $IF_K$ using the WAIT times, where $$IF_K = \frac{W_{max}^K - W_{min}^K}{T_K} * W_{max}^K$$

and the total iteration time $T_K$ is the sum of the CMPT, XFER, WAIT and CONV times. At step 708, the repartition block 506 can determine whether the imbalance factor exceeds a pre-defined threshold. If the imbalance factor does not exceed the pre-defined threshold, then the methods 600 and 700 can proceed to step 602 and 702, respectively, and can be repeated for the next iteration of the procedure. If the imbalance factor does exceed the pre-defined threshold, then the methods 600 and 700 can proceed to steps 608 and 710, respectively.

At step 608, which can be implemented by steps 710-718 of the method 700, the repartition block 506 can direct the data repartitioner 512 to repartition and reassign the data based on the predicted dependencies. For example, at step 710, the repartition block 506 can identify the processing nodes in the cluster 514 with the largest and smallest WAIT times, i and j. It is very likely that the processing node with the largest WAIT time, i, spends less time computing and transferring data than the processing node with the largest WAIT time, j; that is, CMPT(i) and XFER(i) will likely be smaller than CMPT(j) and XFER(j), respectively. At step 712, the repartition block 506 can reference the time estimation model 504 and its corresponding dependencies to compute $D_C$, which is the number of data units to be moved from processor j of the cluster 514 to processor i of the cluster 514 to make their CMPT times roughly equal. Similarly, at step 714, repartition block 506 can reference the time estimation model 504 and its corresponding dependencies to calculate $D_X$, the number of data units to be moved from processor j of the cluster 514 to processor i of the cluster 514 to make their to make the XFER times roughly equal. At step 716, the repartition block 506 sets the number of data units D to be moved from processor j of the cluster 514 to processor i of the cluster 514 as the minimum of $D_C$ and $D_x$. As indicated above, reassigning a minimal amount of data is desirable, as the reassignment and load transfer may be time consuming and the iterative method can converge faster with a smaller load transfer. Further, reconfiguring the data so that the fastest processor(s) and the slowest processor(s) complete any one of the compute and transfer phases at the same time provides substantial benefits in balancing the overall system, thereby ensuring that the reassignment achieves a significant balancing effect per data unit transferred. At step 718, the reparation block 506 can direct the application's data repartitioner 512 to repartition and reassign data of the iterative procedure to the cluster such that the minimum of $D_C$ and $D_x$ data units is moved from processor j of the cluster 514 to processor i of the cluster 514 and the cluster 514 of processors can implement the parallel processing of the data in accordance with the repartitioning and reassignment. Here, the assignment to the processors of the cluster 514 other than processor j and processor i can remain the same during the parallel processing of the data. The data can include both input and model data.

At step 610, the cluster 514 of processors can implement the parallel processing in accordance with the repartition and reassignment, for example, as stated above with respect to step 718. Thereafter, the methods 600 and 700 can repeat.

It should be noted that, in accordance with one exemplary aspect, multiple repartitions can be made simultaneously in one iteration of the methods 600 and 700. For example, at steps 702-708 (and steps 602-606) can be performed as described above. However, at step 710 (and also step 608), the repartition block 506 can identify multiple (2n) processing nodes in the cluster 514 with the n largest and n smallest WAIT times. For example, if n=3, then the repartition block 506 identifies three processing nodes $i_1, i_2, i_3$, with the top three wait times $W^K_{max1}, W^K_{max2}$ and $W^K_{max3}$ (from the highest wait time to the next two lower wait times) and identifies three processing nodes $j_1, j_2, j_3$, with the bottom three wait times $W^K_{min1}, W^K_{min2}$ and $W^K_{min3}$ (from the lowest wait time to the next two higher wait times). At step 712 (and also step 608), the repartition block 506 can reference the time estimation model 504 and its corresponding dependencies to compute $D_{C1}$, which is the number of data units to be moved from processor $j_1$ of the cluster 514 to processor $i_1$ of the cluster 514 to make their CMPT times roughly equal. Also at step 712 (and 608), the repartition block 506 can reference the time estimation model 504 and its corresponding dependencies to compute $D_{C2}$ and $D_{C3}$, which are the number of data units to be moved from processors $j_2$ and $j_3$ of the cluster 514 to processors $i_2$ and $i_3$ of the cluster 514, respectively, to make the corresponding CMPT times of $j_m$ and $i_m$ roughly equal to each other. In turn, at step 714 (and 608), repartition block 506 can reference the time estimation model 504 and its corresponding dependencies to calculate $D_{X1}, D_{X2}, D_{X3}$, the number of data units to be moved from processors $j_1, j_2, j_3$ of the cluster 514 to processors $i_1, i_2, i_3$ of the cluster 514, respectively, to make the corresponding XFER times of $j_m$ and $i_m$ roughly equal to each other. At step 716 (and 608), the repartition block 506 sets the number of data units $D_1, D_2, D_3$, to be moved from processors $j_1, j_2, j_3$ of the cluster 514 to processors $i_1, i_2, i_3$ of the cluster 514, respectively, as the minimum of the corresponding $D_{Cm}$ and $D_{Xm}$. For example, $D_1$ is set to min($D_{C1}, D_{X1}$), $D_2$ is set to min($D_{C2}, D_{X2}$) and $D_3$ is set to min($D_{C3}, D_{X3}$). At step 718 (and 608), the reparation block 506 can direct the application's data repartitioner 512 to repartition and reassign data of the iterative procedure to the cluster such that $D_1$ data units are moved from processor $j_1$ to processor $i_1$, $D_2$ data units are moved from processor $j_2$ to processor $i_2$, and $D_3$ data units are moved from processor $j_3$ to processor $i_3$. At step 718 (and step 610), the cluster 514 of processors can implement the parallel processing of the data in accordance with the repartitioning and reassignment, as described above. Thereafter the methods 600 and 700 can repeat.

In addition, in each of the implementations described above, if at step 710 (and 608), multiple processing nodes in the cluster 516 are found to have the highest wait time(s) $W^K_{max}$ or $W^K_{maxm}$ (i.e., there is a tie between two or more processing nodes), then one of these multiple processing nodes is selected at random to be node j or $j_m$. Similarly, if at step 710 (and 608), multiple processing nodes in the cluster 516 are found to have the lowest wait time(s) $W^K_{min}$ or $W^K_{minm}$ (i.e., there is a tie between two or more processing nodes), then one of the multiple processing nodes is selected at random to be node i or $i_m$.

It should be further noted that, as the cluster 514 scales out, balancing a highly parallelized iterative method itself could possibly be time-consuming. To achieve faster balancing, the balancer 502 may be scaled out to larger clusters using either a hierarchical strategy or a fully distributed, peer-to-peer strategy.

Figure 8:
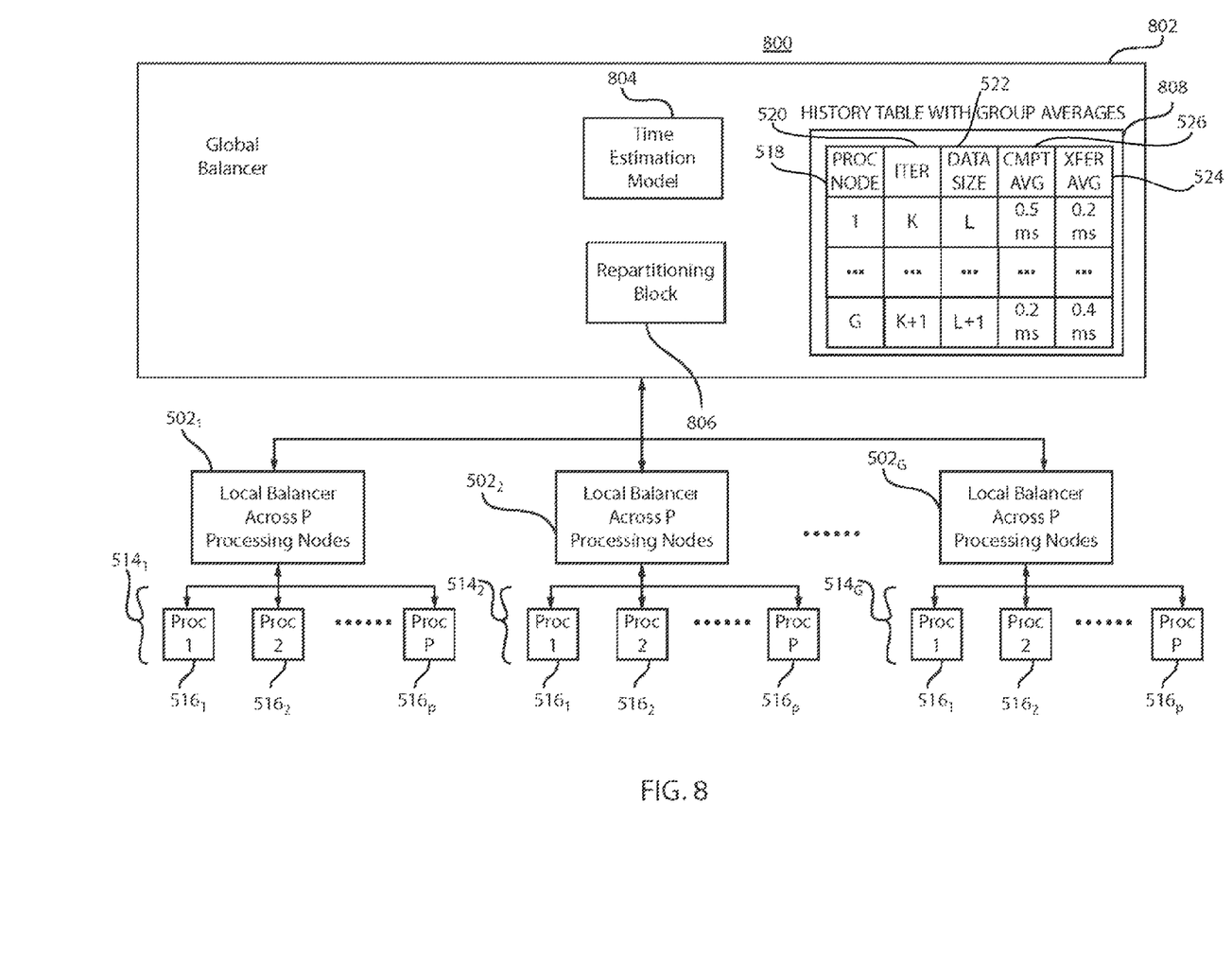
FIG. 8 is a block/flow diagram of an alternative method for managing data loads on a plurality of clusters of processors that implement an iterative procedure through parallel processing in accordance with an exemplary embodiment.

FIG. 8 shows a hierarchical balancing strategy including a global balancer 802 and several local balancers $\mathbf{502}_1\text{-}\mathbf{502}_G$. The processing nodes are divided into G groups or clusters $\mathbf{514}_1\text{-}\mathbf{514}_G$ with P processor nodes or processors $\mathbf{516}_1\text{-}\mathbf{516}_P$ in each group. The local balancer $\mathbf{502}_1\text{-}\mathbf{502}_G$ operates across the P nodes within each group, balancing the iterations across the P nodes as described above with respect to the method 600 and sends the average CMPT, XFER, WAIT and CONV times of the processing nodes within the group to the global balancer 802. The global balancer 802 maintains a history table 808 tracking averages of the phases for all groups and employs a time estimation model 804 that operates as discussed above except that it regards clusters $\mathbf{514}_1\text{-}\mathbf{514}_G$ as processors $\mathbf{516}_1\text{-}\mathbf{516}_P$ and uses the received average completion times as the completion times discussed above to determine the associated dependencies. The global balancer uses the method 600 to direct repartitioning across groups, where each processor mentioned with the respect to the method 600 above is treated by the global balancer 802 as a given cluster from the set of clusters $\mathbf{514}_1\text{-}\mathbf{514}_G$. For example, at step 608, the global balancer 802 directs one balancer 502, to send D units of data from its processing nodes to the balancer $\mathbf{502}_j$ of another cluster. Internally, the source group's data repartitioner 512 (not shown in FIG. 8) relocates D/P units of data from each of the group's or cluster's processing nodes to the processing nodes of the destination group or cluster.

A fully distributed, peer-to-peer strategy involves each processing node computing the imbalance factor between itself and a few closely located target nodes. The processing node then orchestrates data movement to or from the target node using the method of FIG. 6.

Systems and methods for automatically balancing parallelized iterative methods using data repartitioning are disclosed. The strategy addresses both the computation and data transfer phases of such methods and attempt to minimize the wait time for each processing node. Important features of the scheme include the definition of an imbalance factor based on wait times within the iterations and the use of a history table to track both computation and data transfer performance of individual iterations. Other important aspects include the use of a estimator model to predict the performance and data transfer times and the determination of a repartitioning of data that substantially improves the performance of the system.

Having described preferred embodiments of systems and methods for load balancing on heterogeneous processing cluster that implement parallel execution (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for managing data loads on a cluster of processors that implement an iterative procedure through parallel processing of data for the procedure, the method comprising:
   for at least one iteration of the procedure, monitoring completion times of a plurality of different processing phases that are undergone by each of the processors in a given iteration;
   determining whether a load imbalance factor threshold is exceeded in the given iteration based on the completion times of each phase for the given iteration;
   if the load imbalance factor threshold is exceeded, repartitioning the original data load by reassigning the data to the processors based on predicted dependencies between assigned data units of the data and completion times of a plurality of the processors for at least two of the phases; and
   implementing the parallel processing on the cluster of processors in accordance with the reassigning;

wherein the cluster of processors includes at least one processor with heterogeneous processing capability and processing speed, and at least one processor with heterogeneous communication capability and communication speed;

wherein the determining further comprises computing an imbalance factor for the given iteration that is normalized by a total iteration time for the given iteration that includes each of the plurality of different processing phases;

wherein the plurality of different processing phases are successive phases and include a computation phase, a data transfer phase, a synchronization phase and a convergence check phase; and wherein the imbalance factor is $$\frac{W_{max}^K - W_{min}^K}{T_K} * W_{max}^K,$$

where K is the given iteration, $W_{max}^K$ is a maximum completion time for the synchronization phase among the completion times monitored by the monitoring for the synchronization phase for the given iteration, $W_{min}^K$ is a minimum completion time for the synchronization phase among the completion times monitored by the monitoring for the synchronization phase for the given iteration and $T_K$ is the total iteration time for the given iteration.

2. The method of claim 1, wherein the plurality of different processing phases includes a synchronization phase and wherein the repartitioning further comprises determining which of the processors has a highest completion time for the synchronization phase for the given iteration and which of the processors has a lowest completion time for the synchronization phase for the given iteration.

3. The method of claim 2, wherein the processor that has the highest completion time for the synchronization phase for the given iteration is a first processor, wherein the processor that has the lowest completion time for the synchronization phase for the given iteration is a second processor and wherein the repartitioning further comprises reassigning a given number of data units of said data from the first processor to the second processor based on said predicted dependencies.

4. The method of claim 3, wherein the at least two of the phases includes the computation phase and the data transfer phase.

5. The method of claim 4, wherein the dependencies include a first dependency that is a dependency between data units and the completion time of the computation phase and a second dependency that is a dependency between the data units and the completion time of the data transfer phase.

6. The method of claim 5, wherein the repartitioning further comprises computing, based on said first dependency, a first number of data units, the reassignment of which from the first processor to the second processor renders the computation phase of the first processor equal to the computation phase of the second processor, computing, based on said second dependency, a second number of data units, the reassignment of which from the first processor to the second processor renders a data transfer phase of the first processor equal to a data transfer phase of the second processor, and selecting a lesser of the first number of data units and the second number of data units as the given number of data units for repartitioning.

7. The method of claim 1, wherein the method further comprises:
predicting said dependencies based on the completion times monitored by the monitoring for a plurality of iterations of the procedure using a time estimation model.

8. A non-transitory computer readable storage medium comprising a computer readable program, wherein the computer readable program when executed on a computer causes the computer to perform a method for managing data loads on a cluster of processors that implement an iterative procedure through parallel processing of data for the procedure, the method comprising:

for at least one iteration of the procedure, monitoring completion times of a plurality of different processing phases that are undergone by each of the processors in a given iteration;

determining whether a load imbalance factor threshold is exceeded in the given iteration based on the completion times of each phase for the given iteration; and if the load imbalance factor threshold is exceeded, repartitioning the data load by reassigning the data to the processors based on predicted dependencies between assigned data units of the data and completion times of a plurality of the processers for at least two of the phases;

wherein the cluster of processors includes at least one processor with heterogeneous processing capability and processing speed, and at least one processor with heterogeneous communication capability and communication speed;

wherein the determining further comprises computing an imbalance factor for the given iteration that is normalized by a total iteration time for the given iteration that includes each of the plurality of different processing phases;

wherein the plurality of different processing phases are successive phases and include a computation phase, a data transfer phase, a synchronization phase and a convergence check phase; and wherein the imbalance factor is $$\frac{W_{max}^K - W_{min}^K}{T_K} * W_{max}^K,$$

where K is the given iteration, $W_{max}^K$ is a maximum completion time for the synchronization phase among the completion times monitored by the monitoring for the synchronization phase for the given iteration, $W_{min}^K$ is a minimum completion time for the synchronization phase among the completion times monitored by the monitoring for the synchronization phase for the given iteration and $T_K$ is the total iteration time for the given iteration.

9. A system for managing data loads comprising:
a cluster of processors, including at least one processor with heterogeneous processing capability and processing speed, and at least one processor with heterogeneous communication capability and communication speed, configured to implement an iterative procedure through parallel processing of data for the procedure;

a data repartitioner module configured to partition and assign the data to the processors for the parallel processing; and a balancer module configured to, for at least one iteration of the procedure, monitor completion times of a plurality of different processing phases that are undergone by each of the processors in a given iteration, to determine whether a load imbalance factor threshold is exceeded in the given iteration based on the completion times of each phase for the given iteration, and, if the load imbalance factor threshold is exceeded, to direct the data repartitioner module to repartition the data by reassigning the data to the processors based on predicted dependencies between assigned data units of the data and completion times of a plurality of the processers for at least two of the phases;

wherein the balancer module is further configured to compute an imbalance factor for the given iteration that is normalized by a total iteration time for the given iteration that includes each of the plurality of different processing phases wherein the plurality of different processing phases are successive phases and include a computation phase, a data transfer phase, a synchronization phase and a convergence check phase; and wherein the imbalance factor is $$\frac{W_{max}^K - W_{min}^K}{T_K} * W_{max}^K,$$

where K is the given iteration, $W_{max}^K$ is a maximum completion time for the synchronization phase among the monitored completion times monitored for the synchronization phase for the given iteration, $W_{min}^K$ is a minimum completion time for the synchronization phase among the monitored completion times for the synchronization phase for the given iteration and $T_K$ is the total iteration time for the given iteration.

10. The system of claim 9, wherein the plurality of different processing phases includes a synchronization phase and wherein the balancer module is further configured to determine which of the processors has a highest completion time for the synchronization phase for the given iteration and which of the processors has a lowest completion time for the synchronization phase for the given iteration.

11. The system of claim 10, wherein the processor that has the highest completion time for the synchronization phase for the given iteration is a first processor, wherein the processor that has the lowest completion time for the synchronization phase for the given iteration is a second processor and wherein the balancer module is further configured to direct the data repartitioner module to reassign a given number of data units of said data from the first processor to the second processor based on said predicted dependencies.

12. The system of claim 11, wherein the at least two of the phases includes the computation phase and the data transfer phase, wherein the dependencies include a first dependency that is a dependency between data units and the completion time of the computation phase and a second dependency that is a dependency between the data units and the completion time of the data transfer phase.

13. The system of claim 12, wherein the balancer module is further configured to compute, based on said first dependency, a first number of data units, the reassignment of which from the first processor to the second processor renders the computation phase of the first processor equal to the computation phase of the second processor, to compute, based on said second dependency, a second number of data units, the reassignment of which from the first processor to the second processor renders a data transfer phase of the first processor equal to a data transfer phase of the second processor, and to select a lesser of the first number of data units and the second number of data units as the given number of data units.

14. The system of claim 9, wherein the balancer module is further configured to predict said dependencies based on completion times monitored for a plurality of iterations of the procedure using a time estimation model.

* * * * *